United States Patent
Bilinski et al.

(10) Patent No.: US 9,471,669 B2
(45) Date of Patent: Oct. 18, 2016

(54) PRESENTING PREVIOUSLY SELECTED SEARCH RESULTS

(71) Applicant: Google Inc., Mountain View, CA (US)

(72) Inventors: Brandon Bilinski, San Francisco, CA (US); Owen Daniel Otto, Berkeley, CA (US)

(73) Assignee: GOOGLE INC., Mountain View, CA (US)

( * ) Notice: Subject to any disclaimer, the term of this patent is extended or adjusted under 35 U.S.C. 154(b) by 202 days.

(21) Appl. No.: 14/084,697

(22) Filed: Nov. 20, 2013

(65) Prior Publication Data

US 2015/0142778 A1 May 21, 2015

(51) Int. Cl.
*G06F 17/30* (2006.01)
(52) U.S. Cl.
CPC .............................. *G06F 17/30693* (2013.01)
(58) Field of Classification Search
None
See application file for complete search history.

(56) References Cited

U.S. PATENT DOCUMENTS

| | | | |
|---|---|---|---|
| 8,332,393 B2 | 12/2012 | Elyada | |
| 8,839,087 B1* | 9/2014 | Hayden | G06F 17/30412 715/204 |
| 2009/0100021 A1* | 4/2009 | Morris | G06F 17/30876 |
| 2011/0184940 A1 | 7/2011 | Fazil | |
| 2012/0005132 A1 | 1/2012 | Horvitz et al. | |
| 2012/0233157 A1* | 9/2012 | Mohajer | G06Q 30/0256 707/723 |
| 2014/0046938 A1* | 2/2014 | Li | G06F 17/30876 707/727 |

* cited by examiner

*Primary Examiner* — Anh Tai Tran
(74) *Attorney, Agent, or Firm* — Morris & Kamlay LLP

(57) ABSTRACT

The disclosed subject matter provides methods and systems for presenting previously selected search results to a user. A first previously selected search result may be obtained from a first search provider. The first previously selected search result may be a first result, selected by a user, of a first prior search query executed by the first search provider. A second previously selected search result may be obtained from a second search provider, and the second previously selected search result may be a second result, selected by the user, of a second prior search query executed by the second search provider. Next, the first and second previously selected search results may be presented in an interface associated with a third search provider.

28 Claims, 3 Drawing Sheets

PRESENTING PREVIOUSLY SELECTED SEARCH RESULTS

BACKGROUND

Many search applications ("apps") provide a user with his past search queries. Providing a user with his past search queries may allow the user to re-run a previously performed search and receive the previously provided search results. If a user wishes to view a specific search result from a previously performed search, the user must re-run the search by entering the search query again and selecting the specific search result from among all the search results. This action of having to search again in order to find a previously selected search result can be a slow and tedious process.

BRIEF SUMMARY

According to an implementation of the disclosed subject matter, a method may include obtaining a first previously selected search result from a first search provider. The first previously selected search result may be a first result, selected by a user, of a first prior search query executed by the first search provider. A second previously selected search result may be obtained from a second search provider. The second previously selected search result may be a second result, selected by the user, of a second prior search query executed by the second search provider. Next, the first and second previously selected search results may be presented in an interface associated with a third search provider.

An implementation according to the disclosed subject matter provides a system providing a processor configured to obtain a first previously selected search result from a first search provider. The first previously selected search result may be a first result, selected by a user, of a first prior search query executed by the first search provider. A second previously selected search result may be obtained from a second search provider. The second previously selected search result may be a second result, selected by the user, of a second prior search query executed by the second search provider. Next, the first and second previously selected search results may be presented in an interface associated with a third search provider.

Implementations of the disclosed subject matter present previously selected search results to a user. The disclosed system may make it easier for a user to re-find a particular search result he selected from among multiple search results provided to him in response to a search query. By presenting previously selected search results to a user, the user may be able to avoid having to re-run a search query in search of a particular search result he previously selected. This may result in improved search efficiency and time savings, as well as increased user satisfaction. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
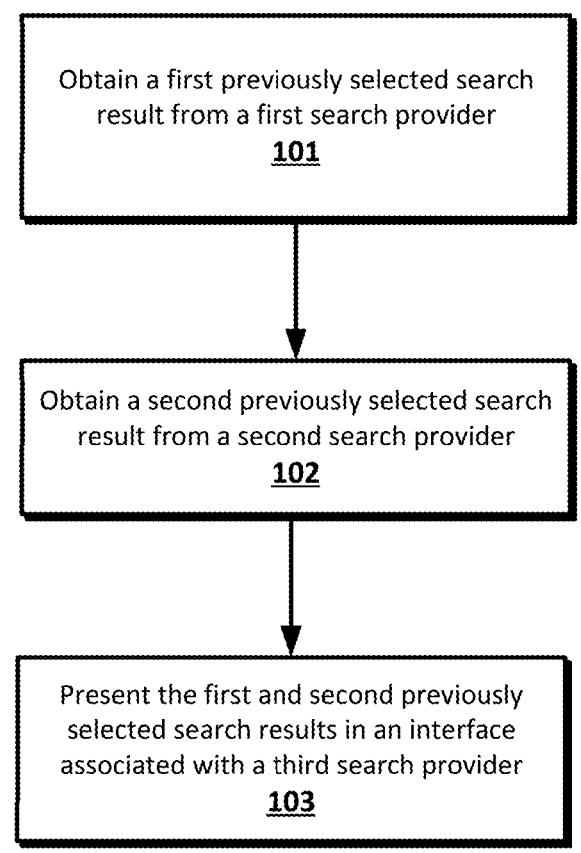
FIG. 1 shows an example process according to an implementation of the disclosed subject matter.

Users of a search function in an application, a webpage, and the like may wish to view a search result from a previously performed search. Implementations of the disclosed subject matter provide methods and systems for presenting a previously selected search result to a user. In general, the disclosed subject matter may receive and store search results that a user selected (e.g., clicked on) from among multiple search results previously presented to the user in response to the user's search query. A database, such as a cloud-based database, may store each search result item that the user selected from a previous search query and this previously selected search result may be presented to the user. The present disclosure may speed up the re-finding process even further than showing recent search queries by making it easy for users to immediately find previously selected search results.

When performing a search, a user may be provided with search results based on his search query. The response to his search query may include one or more search results (e.g., a link, a webpage, an album, a song, a video, an image, and the like). From among the provided search results, a user may select a search result such as by clicking on the search result, playing the search result, viewing the search result, adding the search result to a wish list, accessing the search result, and the like. These selected search results may be stored and presented to a user during a subsequent search session.

As an example, a user interface may provide a search entry field in which a user may enter a search query. The user interface may also display previously selected search results that the user previously selected. In addition, the user's previously selected search result history may be stored in a cloud-based database so that previously selected search results may be presented to a user regardless of whether the search was performed in an application, on the web, on a mobile device, and the like.

As an example, a user may enter a search query for "Rihanna Umbrella." The search provider may provide the user with 10 search results in response to the search query. Among the 10 search results, one search result may be the single of the song Umbrella by Rihanna. The user may select the search result by playing the single of the song Umbrella by Rihanna directly from the search result interface. The user's selection of this particular search result may be stored and may be presented to the user during a subsequent search session. In particular, during a subsequent search session, rather than providing the user with her recent search query of "Rihanna Umbrella," the user may be provided with the particular search result she selected, i.e., the single of the song Umbrella by Rihanna. This allows a user to find search results that she previously selected without having to re-run the search query. Specifically, the user's recently activated search results may be stored and presented to the user (e.g., in chronological order) during each subsequent search session. Rather than providing the user with her past search queries, the user is provided with the past search results which she selected from among all of the search results presented in response to her past search queries. By skipping the step of having to re-run the search query, the user is directly provided with the search results she previously selected, resulting in time saving and increased user satisfaction.

Implementations of the disclosed subject matter provide methods and systems for presenting previously selected search results to a user. FIG. 1 shows an example process according to an implementation of the disclosed subject matter. A method may include obtaining a first previously selected search result from a first search provider, at 101. The first previously selected search result may include a first result, selected by a user, of a first prior search query executed by the first search provider. Next, a second previously selected search result may be obtained from a second search provider, at 102. The second previously selected search result may include a second result, selected by the user, of a second prior search query executed by the second search provider. At 103, the first and second previously selected search results may be presented in an interface associated with a third search provider. Implementations of the disclosed subject matter may also include executing the first prior search query; and receiving the first previously selected search result. The second prior search query may also be executed and the second previously selected search result may be received.

In some cases, in response to executing a prior search query, multiple search results may be presented, and a previously selected search result may be selected by the user from among the multiple search results. For example, in response to a search query for "beef stew recipes" entered by a user, a search provider may execute the search query and provide 10 webpage results in response. From among the 10 webpage search results provided in response to the search query, a user may select one of the webpage search results. The webpage search result that the user selected may be presented to the user during a subsequent search session.

A previously selected search result may be a link to a webpage, a media item, a link to a document, and any other type of search result that may be provided by a search provider in response to a search query. According to an implementation of the disclosed subject matter, prior to obtaining a previously selected search result, it may be determined that the previously selected search result has been selected by a user based upon an action received from the user. For example, a user may take an action to select a search result from among multiple search results by a mouse click (e.g., when a user clicks on a search result to select the search result), an activation of a search result, and any other action that may result in the user selecting a search result. In instances where a search result is selected by activating the search result, activation of a search result may include playing, displaying, machine speaking, previewing, adding to a list, or purchasing a search result. In an implementation, a previously selected search result may be a media item such as a song, a video, a movie, a show, a book, a magazine, a newspaper, an e-book, an album, a playlist, a radio station, a document, and a media content channel. In general, when a previously-selected search result is provided, it may be provided as a link to the search result or as the search result itself For example, if the previously-selected search result is a video, the video may be embedded in the search interface and/or a link to the video may be provided in the search interface. Alternatively or in addition, a graphic or other representation of the previously-selected search result may be provided. For example, the previously-selected search result may be an application in an application store. The application may be provided to the user as an image associated with the application, which is also linked to the application description in the application store or accompanied by a link to the application description. Any other suitable technique for displaying a previously selected search result may be used, and different techniques may be used for different previously selected search results in interfaces as disclosed herein.

An implementation of the disclosed subject matter includes a system comprising a processor configured to obtain a first previously selected search result from a first search provider. The first previously selected search result may be a first result, selected by a user, of a first prior search query executed by the first search provider. Next, a second previously selected search result may be obtained from a second search provider. The second previously selected search result may be a second result, selected by the user, of a second prior search query executed by the second search provider. In an interface associated with a third search provider, the first and second previously selected search results may be presented.

In some cases, it may be determined that a result was selected by the user based upon a length of time the result is accessed by the user. As an example, the time a user accesses a search result may indicate if the user would like to see the search result again. Implementing a minimum access time requirement (e.g., 5 seconds) below which a search result is not considered "selected" by the user may prevent a search result that a user inadvertently selected or which the user selected and realized was not of interest from being considered a previously-selected result. A minimum access time requirement may be a default setting, set by a search provider, or set by a user.

For example, a user may be in search of a particular song, "Wrecking Ball," by Miley Cyrus. The user may not know the name of the song and may enter the search query "Miley Cyrus" to a search provider. In response, the search provider may provide several search results including a link to an official Miley Cyrus webpage, a link to purchase Miley Cyrus's album "Bangerz," the song "We Can't Stop" by Miley Cyrus, a video clip of Miley Cyrus performing in a recent concert, an article about Miley Cyrus, and the song "Wrecking Ball." Because the user is not aware of the name of the specific song for which she is looking (i.e., "Wrecking Ball"), she may first select the song "We Can't Stop" by playing the song from the search interface. Approximately three seconds into playback of the song "We Can't Stop" (i.e., less than the 5 second minimum access time requirement), the user may realize that this is not the song for which she is looking The user may stop playback and/or return back to the search results. Because the user did not access the song "We Can't Stop" beyond the minimum access time requirement, it may be determined that the song "We Can't Stop" was not selected by the user. Next, she may accidently select the link to the official Miley Cyrus webpage and within two seconds of viewing the page (i.e., less than the minimum access time requirement of 5 seconds), she may return back to the search results. Again, because the user did not access the official Miley Cyrus webpage beyond the minimum access time requirement, it may be determined that the official Miley Cyrus webpage was not selected. Finally, the user may select the song "Wrecking Ball" from among the search results. The user may listen to a portion of the song beyond the minimum access time period (e.g., beyond 5 seconds) or the entire song. Since the user accessed the search result beyond the minimum access time requirement of 5 seconds, it may be determined that the user selected the song "Wrecking Ball." As a result, during a subsequent search session, the user may be presented with the previously selected song "Wrecking Ball," but not the song "We Can't Stop" or the official Miley Cyrus webpage since it was determined that these results were not selected. Accordingly, during a subsequent search session the user may be able to easily find and access the song "Wrecking Ball," for which she previously intended to search, without having to re-enter a search query for Miley Cyrus.

In addition to presenting a user with his/her previously selected search results, a user may also be presented with previously selected search results from frequently executed search queries. A frequently executed search query may be a search query that is executed repeatedly by a user. For example, a prior search query may be executed two or more times and a previously selected search result may have been selected by the user two or more times. As another example, a user may enter a search query for Cold Play's Mylo Xyloto album at some point every month. From among the search results to this query, the user may often or always select a link to the Mylo Xyloto album. During subsequent search sessions, the link to the Mylo Xyloto album may be presented to the user as a previously selected search result, even if the user has not recently searched for Cold Play's Mylo Xyloto album and/or has not recently selected the link to the Mylo Xyloto album. A frequently executed search query may be one that is submitted by the user a number of times over a threshold number regardless of the length of time between the searches, or a search query submitted at a frequency over a threshold.

As described herein, previously selected search results may be obtained from one source of search results, such as a search provider, or from various sources of search results. A source of search results may be any search interface that is separately accessible by a user through an entity. Each source of search results may be a separate entity (Recipesforme.com, VideoShare.com, etc.) or may be owned, controlled by, provided by, etc. a single entity (e.g., YouSearch-.com). For example, previously selected search results may be obtained from any entity such as search providers, subscription services, webpages, online retailers, and any other source that may provide a user with a search interface and search results. As shown in FIG. 1, at 103, the first and second previously selected search results may be presented in an interface associated with a third search provider which may or may not be the first search provider and/or the second search provider from which the first and second previously selected search results were obtained, respectively. As an example, a previously selected search result may be an angry cat video that a user watched on a popular video sharing website VideoShare following a search query for angry cats executed by the user on the VideoShare site. This previously selected angry cat video may be obtained from VideoShare and presented during a subsequent search session in an interface provided by YouSearch, a popular search engine.

Figure 2:
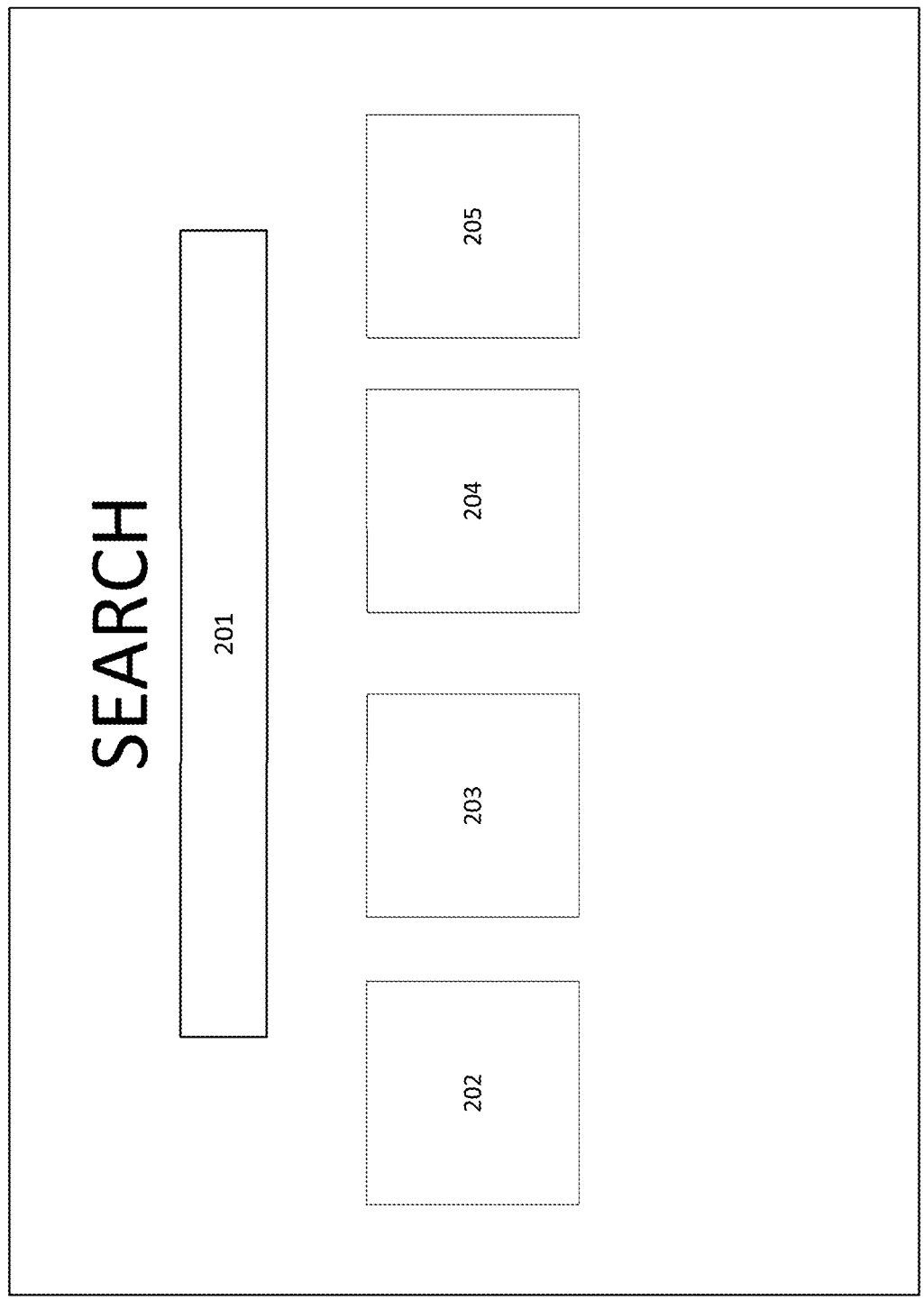
FIG. 2 shows a display interface according to an implementation of the disclosed subject matter.

As described herein, previously selected search results may be presented in an interface associated with a search provider. FIG. 2 shows an example display interface according to an implementation of the disclosed subject matter. As shown in FIG. 2, an interface associated with a search provider may display a search query entry field 201 and multiple previously selected search results 202, 203, 204, and 205. As shown, a user may be able to enter a search query in the search query entry box 201. At the same time, the user may be presented with previously selected search results 202, 203, 204, and 205, each of which was previously selected by the user. Each of the previously selected search results 202, 203, 204, and 205 may be obtained from the search provider associated with the interface shown or from another search provider. For example, previously selected search result 202 may be obtained from the webpage RecipesForMe. The user may have previously entered a search query for beef stew recipes that was executed by RecipesForMe. Previously selected search result 202 may be a link to a webpage for a beef stew recipe which the user previously selected from among search results provided to the user by YouSearch in response to the beef stew recipe search query. Previously selected search result 203 may be obtained from a video sharing site VideoShare. Previously selected search result 203 may be a video of Miley Cyrus performing at a concert which the user previously selected from among search results based on a search query for Miley Cyrus executed on VideoShare. Previously selected search result 204 may be the song Wrecking Ball which the user previously selected based on a search query executed by YouSearch. Additionally, previously selected search result 205 may be the album Mylo Xyloto which the user has selected frequently based on the user's recurring search query for Cold Play's Mylo Xyloto album executed by YouSearch.

Additionally, the interface may present previously selected search results in reverse chronological order such that previously selected search result 202 was selected by the user more recently than previously selected search result 203. The interface may also provide a scroll feature such that by scrolling down the interface the user is presented with previously selected search results over a long period of time. For example, the user may be able to scroll down the interface to see the last 100 search results he previously selected.

In an implementation, previously selected search results may be stored in a cloud-based database. This may allow a user to view his previously selected search results in any interface associated with a search provider regardless of whether the previous search queries were executed on the web, on a mobile device, on a personal computer, or in an application not associated with the search provider.

In an implementation, communication between a source of a previously selected search results (hereinafter "the source") and a search provider may be across one or more bridges between the interfaces. For example, the communications between the source and the search provider may be managed or assisted by a third device, such as, a coordinating device, a local coordinator, a remote server, etc. In such cases, the third device may, for example, obtain a first previously selected search result from the source. The third device may then provide the previously selected search result to the search provider, in which case, the search provider may present the previously selected search result in an interface. Alternatively, the third device may receive, from a search provider, one or more previously selected search results from one or more sources, and present the one or more previously selected search results in an interface. Furthermore, more than one intermediate device may be implemented to facilitate communication between a source (e.g., a first search provider and/or a second search provider) and/or a search provider (e.g., a third search provider).

In situations in which the implementations of the disclosed subject matter collect personal information about users, or may make use of personal information, the users may be provided with an opportunity to control whether programs or features collect user information (e.g., a user's search history, a user's media item activation history, a user's media item purchase history, a user's media item preview history, a user's selected search results, and any other similar data associated with a user), or to control whether and/or how to receive search results from the search provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with a social network may be generalized where location information is obtained (such as to a city, ZIP code, or state level), so that a particular location of a user cannot be determined. Thus, the user may have control over how information is collected about the user and used by a search provider.

Figure 3:
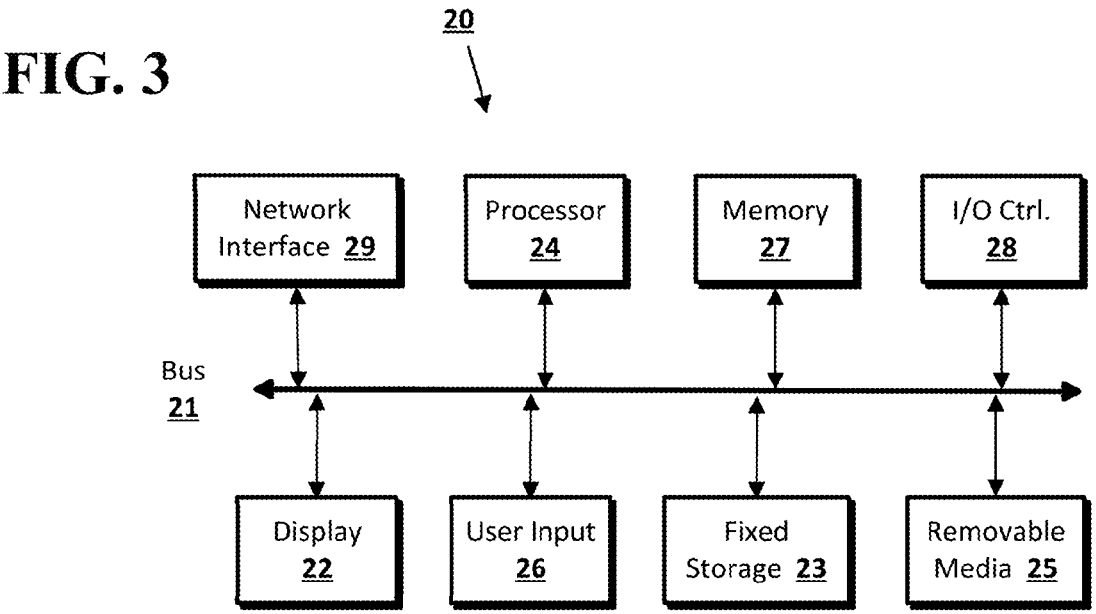
FIG. 3 shows a computer according to an embodiment of the disclosed subject matter.

Embodiments of the presently disclosed subject matter may be implemented in and used with a variety of component and network architectures. FIG. 3 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
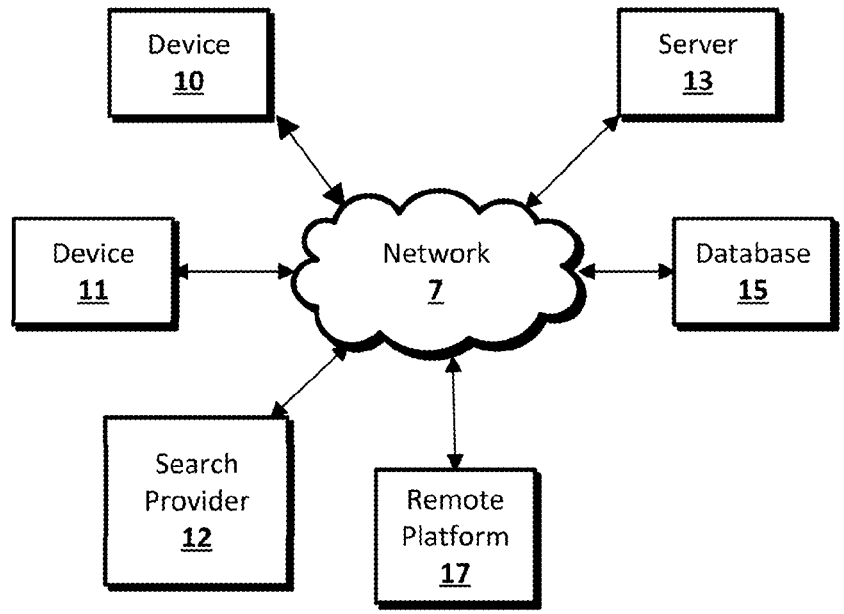
FIG. 4 shows a network configuration according to an embodiment of the disclosed subject matter.

FIG. 4 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more search providers 12, servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more search providers 12, servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method, comprising:
   obtaining a first previously selected search result from a first search provider, wherein the first previously selected search result comprises a first result, selected by a user a number of times greater than a threshold number of times, of a first prior search query executed, at a frequency greater than a threshold frequency, by the first search provider;
   obtaining a second previously selected search result from a second search provider, wherein the second previously selected search result comprises a second result, selected by the user, of a second prior search query executed by the second search provider;
   determining that the number of times that a third result, of the first prior search query, had been accessed by the user had been less than the threshold number of times for the third result to be considered as having been selected by the user; and
   presenting the first previously selected search result and the second previously selected search result in an interface associated with the first search provider.

2. The method of claim 1, further comprising:
   executing the first prior search query; and
   receiving the first previously selected search result.

3. The method of claim 2, further comprising:
   in response to the executing the first prior search query, presenting a plurality of search results; and
   receiving, from the user, a selection of the first previously selected search result from among the plurality of search results.

4. The method of claim 1, further comprising:
   executing the second prior search query; and
   receiving the second previously selected search result.

5. The method of claim 1, further comprising:
   determining that the first result had been selected by the user based upon a length of time the first result had been accessed by the user.

6. The method of claim 1, wherein the interface associated with the first search provider displays a search query entry field and a plurality of previously selected search results, and wherein each of the previously selected search results had been previously selected by the user.

7. The method of claim 1, wherein the first search provider comprises a plurality of search providers, the first prior search query executed by at least one of the plurality of search providers, wherein the interface is associated with another of the plurality of search providers, and wherein the other of the plurality of search providers is different from the at least one of the plurality of search providers.

8. The method of claim 1, further comprising:
   prior to obtaining the first previously selected search result, determining that the first previously selected search result had been selected by the user based upon an action received from the user.

9. The method of claim 8, wherein the action is a mouse click.

10. The method of claim 8, wherein the action is an activation of the first previously selected search result.

11. The method of claim 10, wherein the activation of the first previously selected search result is selected from the group consisting of: playing, displaying, listening, machine speaking, previewing, purchasing, and viewing.

12. The method of claim 1, wherein each of the first previously selected search result and the second previously selected search result is independently selected from the group consisting of: a link to a webpage, a media item, and a link to a document.

13. The method of claim 12, wherein the media item is selected from the group consisting of: a song, a video, a movie, a show, a book, a magazine, a newspaper, an e-book, an album, a playlist, a radio station, a document, and a media content channel.

14. The method of claim 1, further comprising:
   storing the first previously selected search result and the second previously selected search result in a cloud-based database.

15. A system, comprising:
   a processor configured to:
      obtain a first previously selected search result from a first search provider, wherein the first previously selected search result comprises a first result, selected by a user a number of times greater than a threshold number of times, of a first prior search query executed, at a frequency greater than a threshold frequency, by the first search provider;
      obtain a second previously selected search result from a second search provider, wherein the second previously selected search result comprises a second result, selected by the user, of a second prior search query executed by the second search provider;
      determine that the number of times that a third result, of the first prior search query, had been accessed by the user had been less than the threshold number of times for the third result to be considered as having been selected by the user; and
      present the first previously selected search result and the second previously selected search result in an interface associated with the first search provider.

16. The system of claim 15, wherein the processor is further configured to:
   execute the first prior search query; and
   receive the first previously selected search result.

17. The system of claim 16, wherein the processor is further configured to:
   present, in response to executing the first prior search query, a plurality of search results; and
   receive, from the user, a selection of the first previously selected search result from among the plurality of search results.

18. The system of claim 15, wherein the processor is further configured to:
   execute the second prior search query; and
   receive the second previously selected search result.

19. The system of claim 15, wherein the processor is further configured to:

determine that the first result had been selected by the user based upon a length of time the first result had been accessed by the user.

20. The system of claim 15, wherein the interface associated with the first search provider is configured to display a search query entry field and a plurality of previously selected search results, and wherein each of the previously selected search results had been previously selected by the user.

21. The system of claim 15, wherein the first search provider comprises a plurality of search providers, the first prior search query executed by at least one of the plurality of search providers, wherein the interface is associated with another of the plurality of search providers, and wherein the other of the plurality of search providers is different from the at least one of the plurality of search providers.

22. The system of claim 15, wherein the processor is further configured to:
   determine, prior to obtaining the first previously selected search result, that the first previously selected search result had been selected by the user based upon an action received from the user.

23. The system of claim 22, wherein the action is a mouse click.

24. The system of claim 22, wherein the action is an activation of the first previously selected search result.

25. The system of claim 24, wherein the activation of the first previously selected search result is selected from the group consisting of: playing, displaying, listening, machine speaking, previewing, purchasing, and viewing.

26. The system of claim 15, wherein each of the first previously selected search result and the second previously selected search result is independently selected from the group consisting of: a link to a webpage, a media item, and a link to a document.

27. The system of claim 26, wherein the media item is selected from the group consisting of: a song, a video, a movie, a show, a book, a magazine, a newspaper, an e-book, an album, a playlist, a radio station, a document, and a media content channel.

28. The system of claim 15, wherein the processor is further configured to:
   store the first previously selected search result and the second previously selected search result in a cloud-based database.

* * * * *